(12) United States Patent
Demir (10) Patent No.: US 11,035,933 B2
(45) Date of Patent: Jun. 15, 2021

(54) TRANSITION MAP BETWEEN LIDAR AND HIGH-DEFINITION MAP

(71) Applicant: HONDA MOTOR CO., LTD., Tokyo (JP)

(72) Inventor: Mahmut Demir, Mountain View, CA (US)

(73) Assignee: HONDA MOTOR CO., LTD., Tokyo (JP)

(*) Notice: Subject to any disclaimer, the term of this patent is extended or adjusted under 35 U.S.C. 154(b) by 345 days.

(21) Appl. No.: 15/971,812

(22) Filed: May 4, 2018

(65) Prior Publication Data

US 2019/0339705 A1    Nov. 7, 2019

(51) Int. Cl.
| | |
|---|---|
| *G01S 7/48* | (2006.01) |
| *G05D 1/02* | (2020.01) |
| *G01S 17/89* | (2020.01) |
| *G05D 1/00* | (2006.01) |
| *G01C 21/32* | (2006.01) |

(52) U.S. Cl.
CPC ............ *G01S 7/4808* (2013.01); *G01C 21/32* (2013.01); *G01S 17/89* (2013.01); *G05D 1/0088* (2013.01); *G05D 1/0238* (2013.01); *G05D 1/0274* (2013.01)

(58) Field of Classification Search
CPC .. G05D 1/0238; G05D 1/0088; G05D 1/0274; G01C 21/32; G01S 7/4808; G01S 17/89
See application file for complete search history.

(56) References Cited

U.S. PATENT DOCUMENTS

| 7,124,022 B2 | 10/2006 | Carmichael et al. |
| 8,368,695 B2 | 2/2013 | Howell et al. |

(Continued)

FOREIGN PATENT DOCUMENTS

| JP | 2006-171456 A | 6/2006 |
| WO | WO 2017/181638 A1 | 10/2017 |

OTHER PUBLICATIONS

Huang, L., et al., "Tightly-Coupled Lidar and Computer Vision Integration for Vehicle Detection," Intelligent Vehicles Symposium, IEEE, 2009.

(Continued)

*Primary Examiner* — Jeff A Burke
*Assistant Examiner* — Zachary Joseph Wallace
(74) *Attorney, Agent, or Firm* — Arent Fox LLP (57) ABSTRACT

The present disclosure generally relates to methods and systems for determining a position of a vehicle relative to a surrounding environment. A vehicle may obtain a LiDAR map of the surrounding environment at a vehicle location via processing data from a LiDAR device mounted on the vehicle. The vehicle may access a transition map based on the vehicle location to determine a transformation between the LiDAR map and a stored high-definition map. The transition map may define a six degrees of freedom transformation for each of a plurality of locations. The vehicle may apply the transformation to an element of the LiDAR map to determine a corresponding location of the element on the high-definition map. In some aspects, the vehicle may perform an autonomous driving operation based on a location of the vehicle with respect to the element of the high-definition map.

20 Claims, 6 Drawing Sheets

(56) References Cited

U.S. PATENT DOCUMENTS

| | | | |
|---|---|---|---|
| 8,630,805 | B2 | 1/2014 | Becker et al. |
| 8,766,975 | B2 | 7/2014 | Mohr et al. |
| 8,880,340 | B2 | 11/2014 | Erignac et al. |
| 9,008,998 | B2 | 4/2015 | Canter |
| 9,128,185 | B2 | 9/2015 | Zeng |
| 9,414,352 | B2 | 8/2016 | Lee |
| 9,443,309 | B2 | 9/2016 | Menashe et al. |
| 9,684,081 | B2 | 6/2017 | Giurgiu et al. |
| 9,778,370 | B2 | 10/2017 | Buchholz et al. |
| 2004/0158355 | A1 | 8/2004 | Holmqvist et al. |
| 2006/0064202 | A1 | 3/2006 | Gutmann et al. |
| 2014/0267234 | A1 | 9/2014 | Hook et al. |
| 2014/0323148 | A1 | 10/2014 | Schmalstieg et al. |
| 2016/0209846 | A1 | 7/2016 | Eustice et al. |
| 2017/0146656 | A1 | 5/2017 | Belsley et al. |
| 2018/0188039 | A1* | 7/2018 | Chen ........................ G08G 1/20 |
| 2018/0190016 | A1* | 7/2018 | Yang ....................... G01C 21/32 |
| 2018/0216942 | A1* | 8/2018 | Wang ....................... G01S 17/89 |
| 2019/0120947 | A1* | 4/2019 | Wheeler ................. G01S 17/42 |
| 2020/0109954 | A1* | 4/2020 | Li ........................ G05D 1/0274 |

OTHER PUBLICATIONS

Kammel, S., et al. "Lidar-based lane marker detection and mapping," Intelligent Vehicles Symposium, IEEE, Jan. 14, 2008.
Takagi, K., et al. "Road Environment Recognition Using On-vehicle Lidar," Intelligent Vehicles Symposium, IEEE, 2006.

* cited by examiner

TRANSITION MAP BETWEEN LIDAR AND HIGH-DEFINITION MAP

TECHNICAL FIELD

The present disclosure relates to vehicular localization, and more particularly to localization using light detection and ranging (LiDAR).

BACKGROUND

In the vehicular context, localization may refer to various techniques for determining a location of a vehicle with respect to a mapped environment, which may include infrastructure, other vehicles, and pedestrians. LiDAR is one type of sensor that may be used for vehicular localization that emits light beams (e.g., laser beams) and may detect light beam reflections to determine the distance of objects in the environment. LiDAR may produce a point cloud of points representing distances to various objects in the environment. While LiDAR is useful for detecting a local environment, LiDAR alone may not provide understanding of what the objects in the environment are, or understanding of a larger scale context. For example, LiDAR may be used to detect a roadway and objects on the roadway and accurately measure distances to such objects, but LiDAR may not be able to tell a direction of the roadway or how the roadway relates to other roadways that are beyond a detection range.

One approach to using LiDAR point cloud may be to distort a LiDAR point cloud to fit a pre-existing map. A problem with this approach is that distorting a LiDAR point cloud may negate certain optimizations of the LiDAR mapping system that affects the quality of the point cloud map. For example, a metric called 'crispness' of the point cloud map is commonly used to measure the performance of the LiDAR mapping system. Distortions of the point cloud may reduce the 'crispness' of the point cloud map. That is, distorting the LiDAR point cloud may cause difficulties in matching a LiDAR scan to the mapped point cloud and this may cause poor localization accuracy. Distorting the LiDAR point cloud may affect the shapes of the objects contained in the map and may cause difficulties in recognizing these objects.

In view of the foregoing, it may be advantageous to utilize LiDAR with other localization systems to improve localization without causing distortion. Further advantages will become apparent from the disclosure provided below.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

In one aspect, the disclosure provides a method of determining a position of a vehicle relative to a surrounding environment. The method may include obtaining a LiDAR map of the surrounding environment at a vehicle location via a LiDAR device mounted on the vehicle. The method may include accessing a transition map based on the vehicle location to determine a transformation between the LiDAR map and a stored high-definition map, wherein the transition map defines a six degrees of freedom transformation for each of a plurality of locations. The method may include applying the transformation to an element of the LiDAR map to determine a corresponding location of the element on the high-definition map.

In another aspect, the disclosure provides a vehicle that uses a LiDAR map and a HD Map. The vehicle may include a LiDAR system mounted on the vehicle and configured to obtaining a LiDAR map of the surrounding environment at a vehicle location. The vehicle may include a memory storing executable instructions and a processor communicatively coupled to the memory and the LiDAR system. The processor may be configured to access a transition map in the memory based on the vehicle location to determine a transformation between the LiDAR map and a stored high-definition map. The transition map may define a six degrees of freedom transformation for each of a plurality of locations. The processor may be configured to apply the transformation to an element of the LiDAR map to determine a corresponding location of the element on the high-definition map.

In another aspect, the disclosure provides a vehicle localization system for determining a position of a vehicle relative to a surrounding environment. The vehicle localization system may include a LiDAR system mounted on the vehicle and configured to generate a LiDAR map of the surrounding environment at a vehicle location. The vehicle localization system may include a high-definition map including a three-dimensional representation of the surrounding environment. The vehicle localization system may include a transition map that defines a six degrees of freedom transformation for each of a plurality of locations. The vehicle localization system may include a transition module configured to access the transition map based on the vehicle location to determine a transformation between the LiDAR map and the high-definition map and to apply the transformation to an element of the LiDAR map to determine a corresponding location of the element on the high-definition map.

These and other aspects of the invention will become more fully understood upon a review of the detailed description, which follows.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative aspects of the disclosure when read in conjunction with the accompanying drawings, wherein:

DETAILED DESCRIPTION

The following includes definitions of selected terms employed herein. The definitions include various examples and/or forms of components that fall within the scope of a term and that may be used for implementation. The examples are not intended to be limiting.

A "processor," as used herein, processes signals and performs general computing and arithmetic functions. Signals processed by the processor may include digital signals, data signals, computer instructions, processor instructions, messages, a bit, a bit stream, or other computing that may be received, transmitted and/or detected.

A "bus," as used herein, refers to an interconnected architecture that is operably connected to transfer data between computer components within a singular or multiple systems. The bus may be a memory bus, a memory controller, a peripheral bus, an external bus, a crossbar switch, and/or a local bus, among others. The bus may also be a vehicle bus that interconnects components inside a vehicle using protocols, such as Controller Area network (CAN), Local Interconnect Network (LIN), among others.

A "memory," as used herein may include volatile memory and/or non-volatile memory. Non-volatile memory may include, for example, ROM (read only memory), PROM (programmable read only memory), EPROM (erasable PROM) and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and/or direct RAM bus RAM (DRRAM).

An "operable connection," as used herein may include a connection by which entities are "operably connected", is one in which signals, physical communications, and/or logical communications may be sent and/or received. An operable connection may include a physical interface, a data interface and/or an electrical interface.

A "vehicle," as used herein, refers to any moving vehicle that is powered by any form of energy. A vehicle may carry human occupants or cargo. The term "vehicle" includes, but is not limited to: cars, trucks, vans, minivans, SUVs, motorcycles, scooters, boats, personal watercraft, and aircraft. In some cases, a motor vehicle includes one or more engines.

Autonomous driving systems may use a high-definition (HD) map to perform a variety of autonomous driving functions such as path planning, decision making, and vehicle control. A HD map is a three-dimensional model of a driving environment (e.g., roadway) that includes permanent features associated with the roadway including road boundaries, lane markings, traffic control devices, and signs, among other features. Generally, a HD map is generated by a third party company and provided to vehicle manufacturers. The HD map may be stored in a computer storage device of a vehicle and updated as needed. Since the HD map is pre-generated, the HD map does not include current information about dynamic aspects of the driving environment such as the ego vehicle, other vehicles, and pedestrians. An autonomous vehicle may obtain current information about the dynamic aspects of the driving environment using a perception system or sensor system.

In order to use the current information with a HD map, a typical approach has been to distort the current information to fit the HD map. For example, if the sensor system generates a LiDAR map that detects a traffic light 2 meters apart from its correct position, the region of the LiDAR map which contains the traffic light will be distorted to match the correct position of traffic light in the HD map. Distorting the LiDAR map may cause several problems. First, the distortion process may not take into account the relative positions of the elements in the LiDAR map. For example, optimizations performed by the LiDAR mapping system to match the detected lane lines with traffic sign may be lost if the LiDAR map is distorted to fit the HD map. Second, the distortion process may deform the original shapes of the objects. As a result, deformation on the objects may cause difficulty in an object detection module to detect objects correctly. Accordingly, such distortions of the LiDAR map may be undesirable.

The present disclosure uses a transition map to adjust for differences between a vehicle generated LiDAR map and a stored HD map. The LiDAR map may be generated continuously by the vehicle as the vehicle travels along a roadway. Accordingly, the LiDAR map may provide the most current locations of objects relative to the vehicle. The HD map may be pre-generated by a third party that uses different equipment and different techniques than the vehicle. The HD map may describe areas beyond the range of the LiDAR sensor of the vehicle such as areas that are occluded by other objects. Accordingly, the HD map may be used as a reference for various autonomous driving functions.

Since the LiDAR map and HD map may be generated using different techniques or different equipment, the maps may represent the locations of the objects differently. The LiDAR map, for example, may be generated by a LiDAR based simultaneous localization and mapping (SLAM) algorithm. In contrast, a HD map, for example, may be generated by a very precise GPS device together with a survey equipment. Accordingly, in order for information from the LiDAR map to be applied to the HD Map for localization, a transformation may be applied to points on the LiDAR map to find a corresponding point in the HD map. The transition map may also be used in the opposite direction to transform a point or object on the HD map into a corresponding point on the LiDAR map. The transformation between the LiDAR map and the HD map may be defined as a six degree of freedom transformation. For example, the transformation may adjust x, y, and z coordinates as well as yaw, pitch, and roll.

Figure 1:
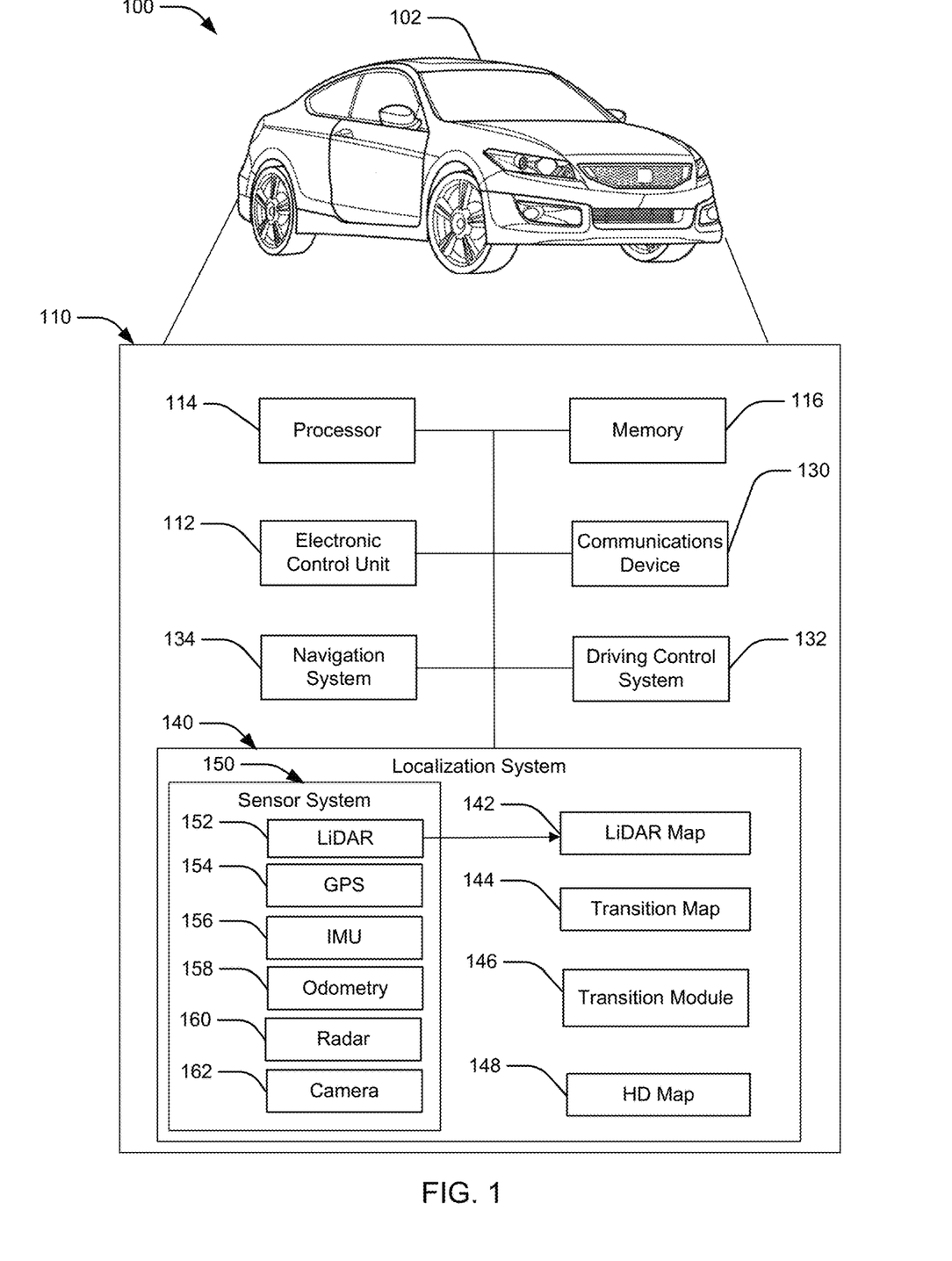
FIG. 1 illustrates a schematic view of an example operating environment of a vehicle localization system in accordance with aspects of the present disclosure.

Turning to FIG. 1, a schematic view of an example operating environment 100 of a vehicle 102 includes a localization system 140. The localization system 140 may reside within a vehicle 102 along with other components of an autonomous driving system 110. The components of the autonomous driving system 110, as well as the components of other systems, hardware architectures, and software architectures discussed herein, may be combined, omitted or organized into various implementations.

The vehicle 102 may generally include an electronic control unit (ECU) 112 that operably controls a plurality of vehicle systems. The vehicle systems may include, but are not limited to, the autonomous driving system 110 that includes the localization system 140, among others, including a sensor system 150, a driving control system 132, a navigation system 134, vehicle HVAC systems, vehicle audio systems, vehicle video systems, vehicle infotainment systems, vehicle telephone systems, and the like.

The sensor system 150 may include multiple sensors that provide input to the autonomous driving system 110. In particular, the sensor system 150 may include a LiDAR system 152. The LiDAR system 152 may be a three-dimensional LiDAR system that utilizes an array of spinning lasers to illuminate a driving environment. The LiDAR system 152 may capture a point cloud by detecting reflected light beams and determining a distance to a reflective surface. The sensor system 150 may analyze the point cloud to detect objects. For example, the sensor system 150 may cluster points and compare the clusters to profiles of expected objects (e.g., vehicles, bicycles, pedestrians, etc.). The sensor system 150 may track detected objects (e.g., using a particle filter) to determine trajectories of the detected objects.

The sensor system 150 may include additional sensors that may be used in conjunction with the LiDAR system 152. For example, the sensor system 150 may include one or more of a global positioning system (GPS) 154 or other satellite-based navigation system, an inertial measurement unit (IMU) 156, an odometry sensor 158, a radar system 160, and/or a camera 162 or other image-capturing device (e.g., a scanner). The GPS 154 may use signals received from multiple satellites to calculate a location. The IMU 156 may detect acceleration and deceleration of the vehicle 102. The odometry sensor 158 may measure a distance traveled by the vehicle 102. The radar system 160 may use reflected radio waves to detect objects. The camera 162 may obtain images of a vehicle environment and the sensor system 150 may apply image recognition to perform object detection. The sensor system 150 may combine the output of multiple sensors to both locate the vehicle 102 and detect and track other objects. Objects capable of moving (e.g., pedestrians and other vehicles) are interchangeably referred to herein as actors. The sensor system 150 may provide the position and movement tracking information for detected actors to the autonomous driving system 110.

The localization system 140 may determine a location of the vehicle 102 and/or other actors with respect to both a LiDAR Map 142 and a HD Map 148. The localization system may include the LiDAR map 142, a Transition Map 144, a Transition Module 146, and a HD Map 148.

The LiDAR Map 142 may be generated by the sensor system 150, which includes the LiDAR system 152. The LiDAR Map 142 may include a LiDAR point cloud or be based on the LiDAR point cloud. The LiDAR point cloud may be represented by a set of 3 dimensional point structures. Each 3 dimensional point structure may contain additional information about the light reflectivity and a time-stamp. The LiDAR Map 142 may be represented by a 3 dimensional occupancy grid structure to reduce the LiDAR Map 142 storage requirements. The LiDAR Map 142 may include objects detected in the mapped region. Detected objects may be represented with a point cloud. Detected objects may contain the semantic class and six degrees of freedom pose information. The LiDAR Map 142 may contain the poses of the LiDAR system 152 with timestamp information. The LiDAR Map 142 may be generated offline using the raw point cloud information coming from the LiDAR system 152. The LiDAR Map 142 may have a fixed point of origin and it may correspond to the initial point where a LiDAR mapping procedure started. The HD Map 148 may have a different point of origin and it may be defined in the world coordinates (e.g., latitude, longitude and altitude). The HD Map 148 may include types of objects which can be detected both in the HD Map 148 and the LiDAR Map 142. For example, traffic signs, lane lines, traffic lights, curbs etc. can be included in both types of map. The LiDAR system 152 or the vehicle 102 may have a point of origin which changes as the vehicle moves.

The Transition Map 144 may be a data structure that includes transformations between the LiDAR Map 142 and the HD Map 148 for a plurality of locations. In an aspect, the transformations are six degree of freedom transformations that indicate an adjustment to each of x, y, and z coordinates, yaw, pitch, and roll. Some of the degrees of freedom may have no adjustment.

The Transition Module 146 may include a computer-readable medium (e.g., memory 116) storing instructions executable by a processor (e.g., processor 114) to transform an element of the LiDAR Map 142 to a corresponding element of the HD Map 148. For example, the Transition Module 146 may apply a six degree of freedom transformation to a location of the element on the LiDAR Map 142. The Transition Module 146 may adjust each degree of freedom of the element to determine a location of the element on the HD Map 148. The Transition Module 146 may also transform elements on the HD Map 148 into elements on the LiDAR Map 142. For example, the Transition Module 146 may transform the location of a known element such as a stop sign on the HD Map 148 into a location on the LiDAR Map 142 to confirm the relative location of the vehicle 102 with respect to the stop sign.

The HD Map 148 may be a data structure representing a three-dimensional model of a vehicle environment. The HD Map 148 may be generated by a third party other than a vehicle manufacturer. The HD Map 148 may be stored in a computer storage device of the vehicle 102. In an aspect, for example, the vehicle 102 may periodically download and store portions of the HD Map 148 for areas where the vehicle 102 is likely to travel (e.g., within a threshold distance of the vehicle 102 or a planned route of the vehicle 102). The HD Map 148 may include locations for fixed features of the driving environment. For example, the HD Map 148 may include infrastructure elements such as roadways, curbs, walls, dividers, signs, traffic control devices, road markings, and sidewalks, among other elements.

The ECU 112 may include internal processing memory, an interface circuit, and bus lines for transferring data, sending commands, and communicating with the vehicle systems. The ECU 112 may include an internal processor and memory, not shown. The vehicle 102 may also include a bus for sending data internally among the various components of the autonomous driving system 110.

The vehicle 102 may further include a communications device 130 (e.g., wireless modem) for providing wired or wireless computer communications utilizing various protocols to send/receive electronic signals internally with respect to features and systems within the vehicle 102 and with respect to external devices. These protocols may include a wireless system utilizing radio-frequency (RF) communications (e.g., IEEE 802.11 (Wi-Fi), IEEE 802.15.1 (Bluetooth®)), a near field communication system (NFC) (e.g., ISO 13157), a local area network (LAN), a wireless wide area network (WWAN) (e.g., cellular) and/or a point-topoint system. Additionally, the communications device 130 of the vehicle 102 may be operably connected for internal computer communication via a bus (e.g., a CAN or a LIN protocol bus) to facilitate data input and output between the electronic control unit 112 and vehicle features and systems. In an aspect, the communications device 130 may be configured for vehicle-to-vehicle (V2V) communications. For example, V2V communications may include wireless communications over a reserved frequency spectrum. As another example, V2V communications may include an ad hoc network between vehicles set up using Wi-Fi or Bluetooth®.

The vehicle 102 may include a driving control system 132 for controlling the vehicle 102. The driving control system 132 may control the vehicle 102 based on a navigation route selected by the navigation system 134 and decisions made by the autonomous driving system 110 based on input from the localization system 140. The driving control system 132 may include controllers that translate the navigation route and decisions into inputs to different vehicle controls (e.g., steering, acceleration, and braking).

The vehicle 102 may include a navigation system 134 for determining a route of the vehicle 102. In an aspect, the navigation system 134 may determine high-level options for the vehicle 102. For example, the navigation system 134 may determine that the vehicle 102 should make a left turn at an intersection based on the desired destination and current location. The navigation system 134 may employ conventional route planning algorithms to select a route that minimizes distance, travel time, or other factors.

Figure 2:
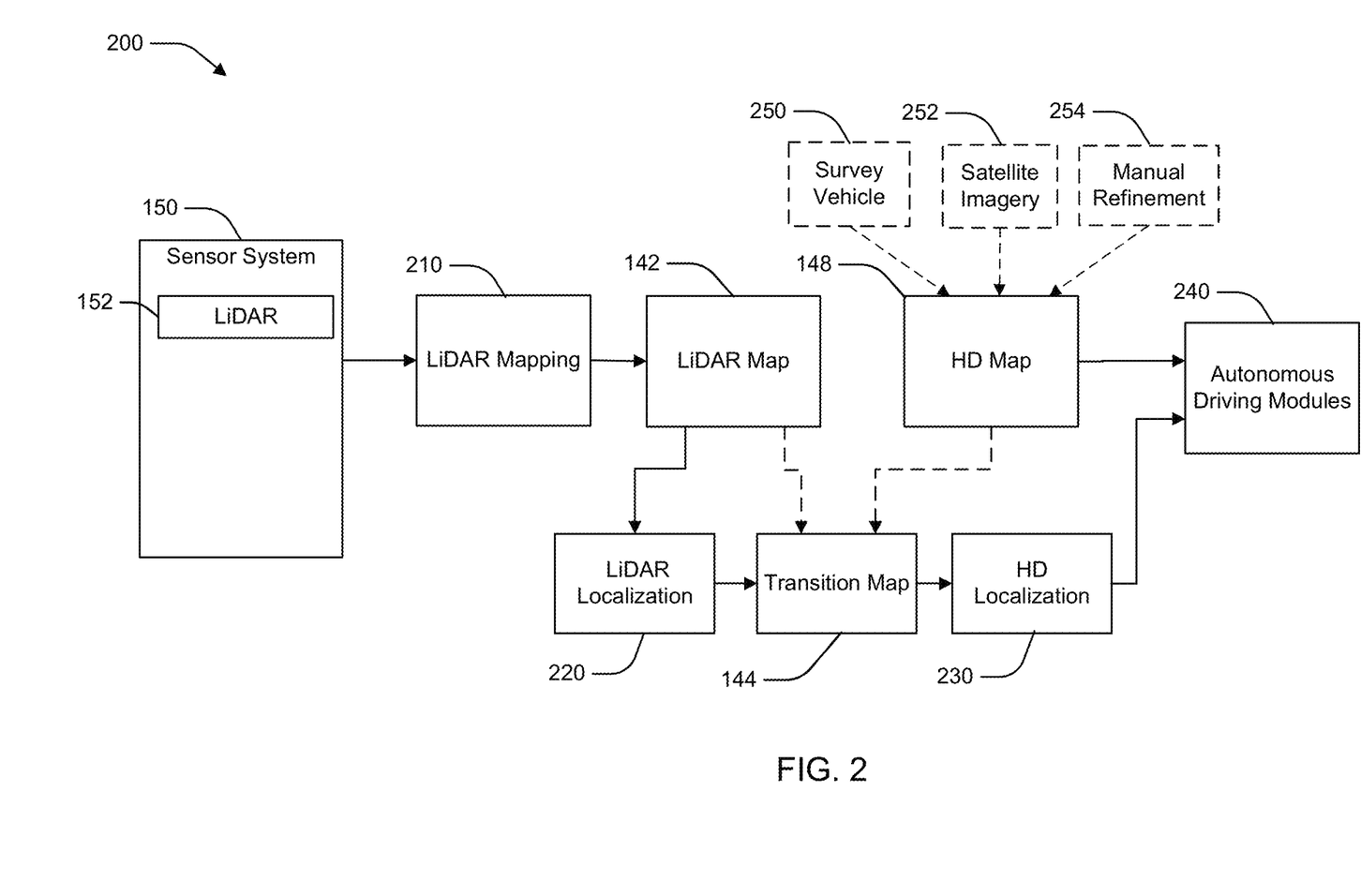
FIG. 2 illustrates a conceptual diagram showing an overview of the localization system and its relationship with other autonomous driving modules in accordance with aspects of the present disclosure.

FIG. 2 illustrates a conceptual diagram showing a processing pipeline 200 for the localization system 140 in accordance with aspects of the present disclosure. The processing pipeline 200 may include the sensor system 150 for generating input from multiple sensors including LiDAR system 152, a LiDAR Mapping module 210 that converts LiDAR data into the LiDAR Map 142, a LiDAR Localization module 220 that determines a location of the vehicle 102 with respect to objects in the LiDAR Map 142, the Transition Map 144, the HD Map 148, a HD Localization module 230 that determines a location of the vehicle 102 with respect to objects on the HD Map 148, and Autonomous Driving Modules 240 that perform an autonomous driving operation based on a location of the vehicle with respect to an element of the HD Map 148.

The LiDAR Mapping module 210 may convert LiDAR sensory data into the LiDAR Map 142. For example, the LiDAR Mapping module 210 may be executed by the sensor system 150 to perform various processing of the LiDAR data. The processing may include, for example, calculating six degree of freedom position (pose) of the LiDAR sensor. The processing may include merging point cloud data based on the calculated LiDAR poses to get a complete LiDAR map. The processing may include clustering of points to identify objects. The LiDAR Mapping module 210 may compare the clusters of points to profiles of different object types to determine a type of object present. In creating the LiDAR Map 142, the LiDAR Mapping module 210 may replace the cluster of points with a representation of the detected object.

The LiDAR Map 142 may be used by the LiDAR Localization module 220 to determine a position of the vehicle 102 with respect to the LiDAR Map. The position of the vehicle 102 on the LiDAR Map 142 may be provided to the Transition Map 144 to determine the location of the vehicle 102 on the HD Map 148. Similarly, the position of any element on the LiDAR Map 142 can be provided to the Transition Map 144 to determine their respective location on the HD Map 148. In an aspect, for example, an object such as another vehicle may not be an element on the HD Map 148. In order to determine the location of the other vehicle on the HD Map 148, the Transition Module 146 (FIG. 1), may access the Transition Map 144 to determine a transformation of the location based on the current location of the vehicle 102. The Transition Module 146 may determine a six degree of freedom transformation for the current vehicle location.

The HD Localization module 230 may apply the six degree of freedom transformation to the location of the element on the LiDAR Map 142 to determine the location of the object on the HD Map 148. The location of the object on the HD Map 148 may use the coordinate system of the HD Map 148. Accordingly, the location of the object on the HD Map 148 may be compared to the location of other objects on the HD Map 148. For example, the position of another vehicle may be compared with the position of a lane marking to determine whether the other vehicle is within a defined lane.

The location of elements of the LiDAR Map 142 on the HD Map 148 may be provided to the autonomous driving modules 240. The Autonomous Driving Modules 240 may perform an autonomous driving operation based on the location of the vehicle 102 with respect to the element on the HD Map 148. For example, the Autonomous Driving Modules 240 may predict a likely trajectory of the object and determine whether the vehicle 102 should change course to avoid the object.

FIG. 2 also illustrates generation of the HD Map 148 and the Transition Map 144. The HD Map 148 may be generated by a third party using a Survey Vehicle 250. The Survey Vehicle 250 may be equipped with a sensor system similar to the sensor system 150, but the Survey Vehicle 250 may have a different configuration that results in a different representation of objects. For example, the Survey Vehicle 250 may generate a greater density of points in the point cloud, leading to surfaces being detected that may not be detected by the vehicle 102. The HD Map 148 may also be based on additional sources such as satellite imagery 252 and manual refinement 254. For example, the details obtained by the Survey Vehicle 250 may be added to a map based on a satellite image. Accordingly, certain distances on the HD Map 148 may be based on satellite imaging rather than LiDAR. Further, manual refinement 254 may involve a human verifying or modifying an object on the HD Map 148, for example, based on photographs or survey data.

The Transition Map 144 may be based on the LiDAR Map 142 and the HD Map 148. In an aspect, the Transition Map 144 may be generated based on the location of identified features. The HD Map 148 may be annotated with identified features (e.g., locations of stop signs). The LiDAR Map 142 may include objects that may be recognized as the identified features, for example, due to a close match to an object pattern. Accordingly, in an aspect, the Transition Map 144 may be generated by determining the transformation from the LiDAR Map 142 to the HD Map 148 for the identified features. In one aspect, the transformation associated with a feature may be included on the Transition Map 144 for the location of the feature. Because the vehicle 102 is unlikely to be located at the feature for which a transformation is available, the HD localization module 230 may interpolate a transformation from a subset of transformations (e.g., the three closest transformations) on the Transition Map 144. In another aspect, the Transition Map 144 may store a transformation for each of a plurality of grid locations in order to get a faster access to the desired transformation in the runtime. The transformation may be based on one or more transformations of identified features from the perspective of a vehicle in the grid location. The HD Localization module 230 may determine the transformation for the current location based on the grid location corresponding to the current location. Further examples of transition maps are described with respect to FIG. 3 and FIG. 4.

Figure 3:
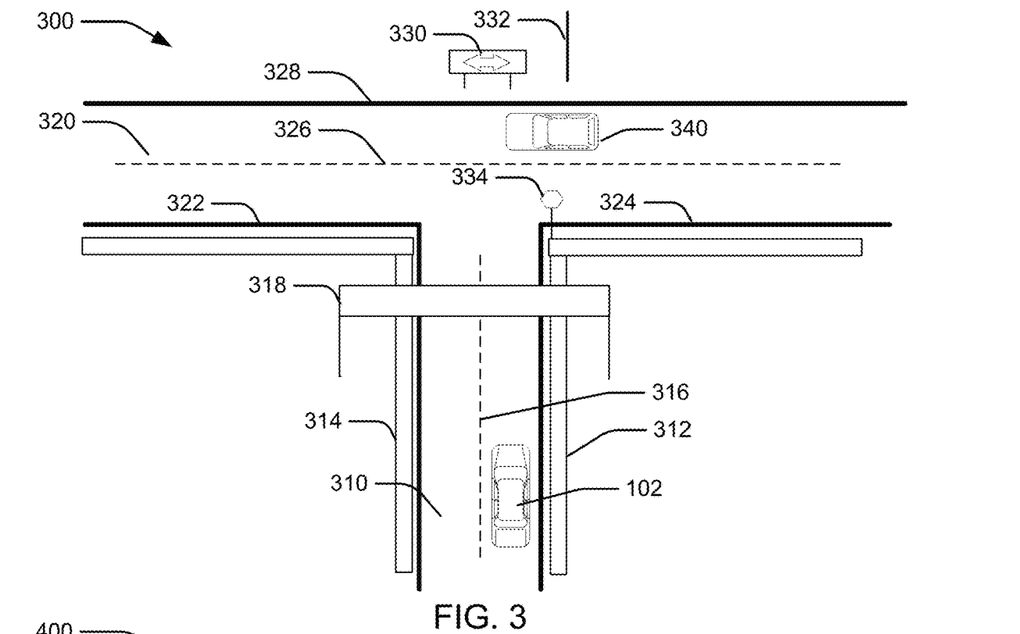
FIG. 3 illustrates an example transition map including transformations for identifiable features in accordance with aspects of the present disclosure.

FIG. 3 illustrates an example transition map 300 that may be generated for a driving environment. For example, the driving environment may include a T-intersection at which a road 310 intersects a road 320. A vehicle 102 may be on the road 310 and generate a LiDAR map of the intersection. The transition map 300 may include transformations for various identifiable features. For example, the LiDAR system 152 may be able to identify an overhead sign 318, a stop sign 334, and a direction sign 330 that faces the road 310. Another sign 332 may face the road 320 and present a narrow edge to the vehicle 102 and therefore not serve as a suitable identified feature. It should be noted, however, that the sign 332 may be mapped by a vehicle traveling on road 320 and added to the transition map 300. Additionally, in an aspect, road features may be used as identifiable features. For example, a LiDAR map may include sidewalks 312, 314 and lane lines 316 and 326. Curbs 322, 324, and 328 may also be identified on a LiDAR map. Road features may present some difficulties for determining a transformation because the road features tend to extend longitudinally. Accordingly, identifiable points on the road features such as corners and intersections may be used as the location of the identified feature.

The Transition Module 146 may use the transition map 300 by determining a transformation for the location of the vehicle 102. Since the vehicle 102 is not co-located with an identifiable feature, the Transition Module 146 may interpolate the transformation based on a subset of the identifiable features. For example, the Transition Module 146 may interpolate a transformation for the location of the vehicle 102 based on known transformations for the overhead sign 318, the sidewalk 314, and the stop sign 334 included in the Transition Map 144. The Transition Module 146 may then apply the transformation to an object such as the vehicle 340 to determine the location of the vehicle 340 on the HD Map 148. For example, determining that the location of the vehicle 340 is on the road 320 may be used to predict a trajectory of the vehicle 340 (e.g., whether the vehicle 340 will turn onto the road 310).

In an aspect, the Transition Map 144 may be flattened to two dimensions to reduce the number of transformations stored in the Transition Map 144. Although the LiDAR Map 142 and HD Map 148 may be three-dimensional, the height of the vehicle 102 may have little impact on the difference in coordinate systems and measurements. Accordingly, the Transition Map 144 may store transformations based on two-dimensional coordinates.

Figure 4:
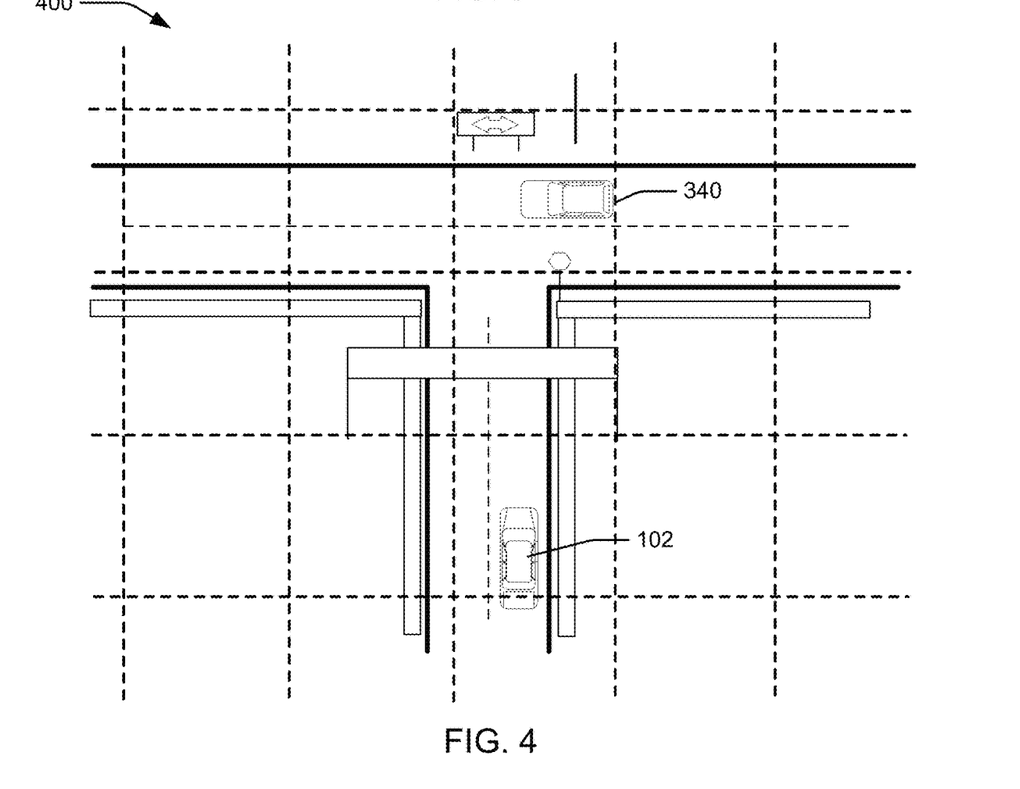
FIG. 4 illustrates another example transition map using grid coordinates in accordance with aspects of the present disclosure.

FIG. 4 illustrates another example transition map 400 that may be generated for a driving environment. The driving environment may be the same driving environment as in FIG. 3 and include the same features. Instead of including a transformation for a plurality of identifiable features, the transition map 400 may include a transformation for a grid location. The transition map 400 may be divided into grid locations, for example, based on regular GPS coordinate boundaries. As discussed above, a transformation for a location may be based on interpolation of transformation for different identifiable features. Accordingly, the grid location including the vehicle 102 may be associated with the same transformation determined based on interpolation with respect to FIG. 3. Instead of determining the closest identifiable features in the transition map 300, when using the transition map 400, the Transition Module 146 may simply look up the transformation for the current grid location of the vehicle 102. The vehicle 340, located in a different grid location may obtain a different transformation from the transition map 400. The different transformation may be based on different identifiable features and/or a different weighting applied to the interpolation. Calculating and storing transformations for each grid location may provide an increase in speed when querying a large amount of transformations. In some instances where identifiable features are sparse, the transition map 400 may require greater storage space than the transition map 300. In another aspect, grid locations that are inaccessible to vehicles may be omitted from the transition map 400.

Figure 5:
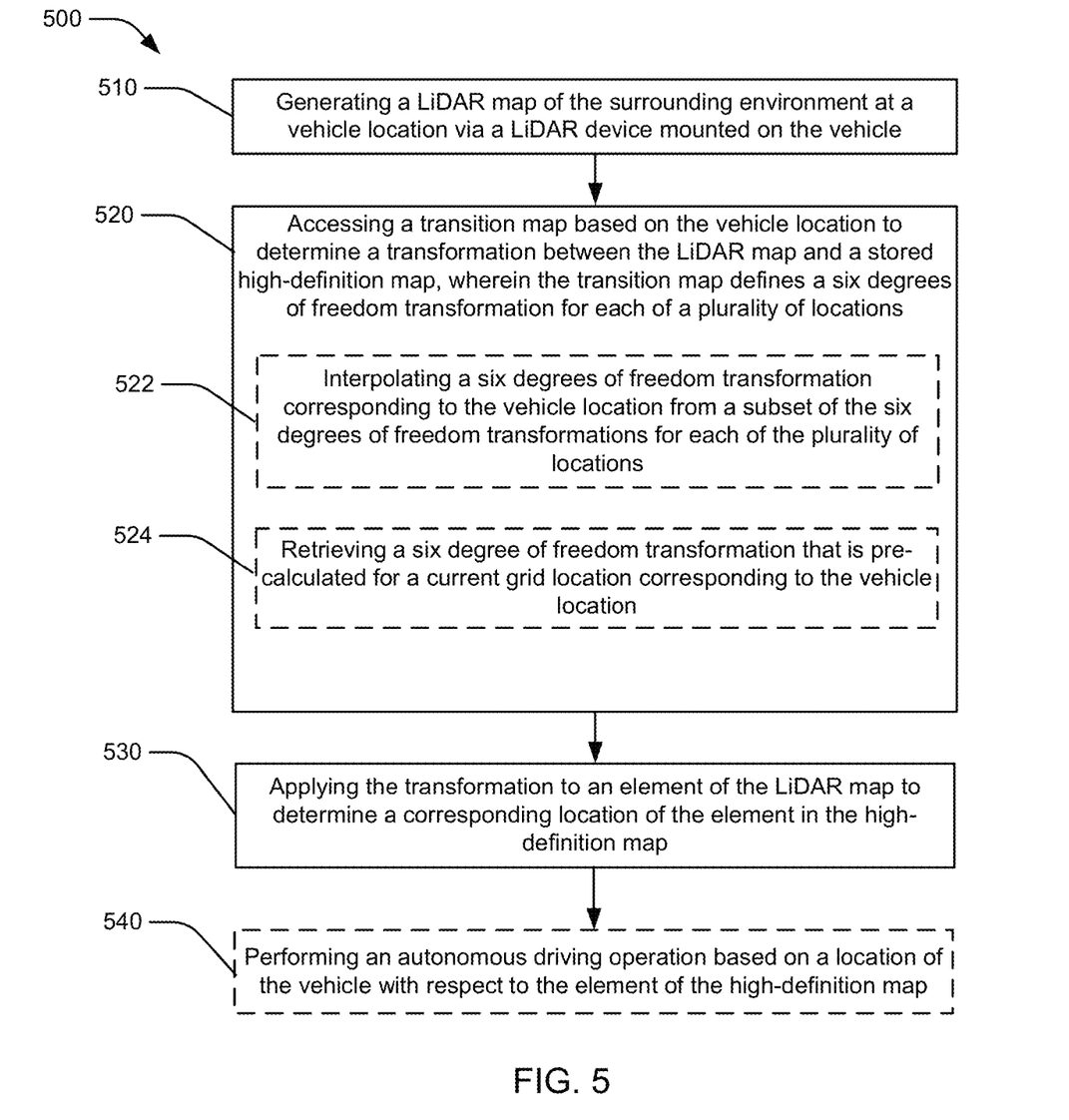
FIG. 5 illustrates a flowchart showing an example method of determining a position of a vehicle relative to a surrounding environment in accordance with aspects of the present disclosure.

FIG. 5 illustrates a flowchart showing an example method of determining a position of a vehicle relative to a surrounding environment, in accordance with aspects of the present disclosure. The method 500 may be performed by an autonomous driving system 110 including a localization system 140 within a vehicle 102. Further, the position of the vehicle relative to the surrounding environment may be used by the autonomous driving system 110 to perform an autonomous driving operation.

At block 510, the method 500 may include obtaining a LiDAR map of a surrounding environment at a vehicle location via a LiDAR device mounted on the vehicle. In an aspect, for example, the sensor system 150 may obtain the LiDAR Map 142 of the surrounding environment at the vehicle location via the LiDAR system 152 mounted on the vehicle. Obtaining the LiDAR Map 142 may include processing raw input generated by the sensors to identify the positions of the objects as wells as the positions of the LiDAR sensor for all scans. That is, the sensor system 150 may determine the vehicle location based on the LiDAR map.

At block 520, the method 500 may include accessing a transition map based on the vehicle location to determine a transformation between the LiDAR map and a stored high-definition map. The transition map may define a six degrees of freedom transformation for each of a plurality of locations. In an aspect, the Localization System 140 may access the Transition Map 144 based on the vehicle location to determine the six degrees of freedom transformation between the LiDAR Map 142 and a stored HD Map 148 for a plurality of locations. In an aspect, at sub-block 522, the block 520 may include interpolating a six degrees of freedom transformation corresponding to the vehicle location from a subset of the six degrees of freedom transformations for each of the plurality of locations. For example, the Localization System 140 may interpolate the six degrees of freedom transformation corresponding to the vehicle location from a subset of the six degrees of freedom transformations for each of the plurality of locations in transition map 300. For example, each of the plurality of locations may correspond to an element identified in both the LiDAR Map and the HD Map, and the transformation may be based on a change in coordinates of the element between the LiDAR Map and the HD Map. In another aspect, at sub-block 524, the block 520 may include retrieving a six degree of freedom transformation that is pre-calculated for a current grid location corresponding to the vehicle location. For example, the Localization System 140 may retrieve a six degree of freedom transformation for a current grid location in transition map 400 corresponding to the vehicle location.

At block 530, the method 500 may include applying the transformation to an element of the LiDAR map to determine a corresponding location of the element in the high-definition map. In an aspect, for example, the Transition Module 146 may apply the transformation to an element of the LiDAR Map 142 to determine a corresponding location of the element in the HD Map 148.

At block 540, the method 500 may optionally include performing an autonomous driving operation based on a location of the vehicle with respect to the element of the high-definition map. In an aspect, for example, the autonomous driving system 110 may execute the Driving Control System 132 to control the vehicle 102 to perform the autonomous driving operation based on a location of the vehicle with respect to the element of the high-definition map. For example, the autonomous driving system 110 may control a steering system of the vehicle 102 using the Driving Control System 132 to direct the vehicle 102 along a path through an intersection, avoiding another vehicle (e.g., vehicle 340) according to the location of the vehicle 102 and the vehicle 340 on the HD Map 148 including the intersection.

Figure 6:
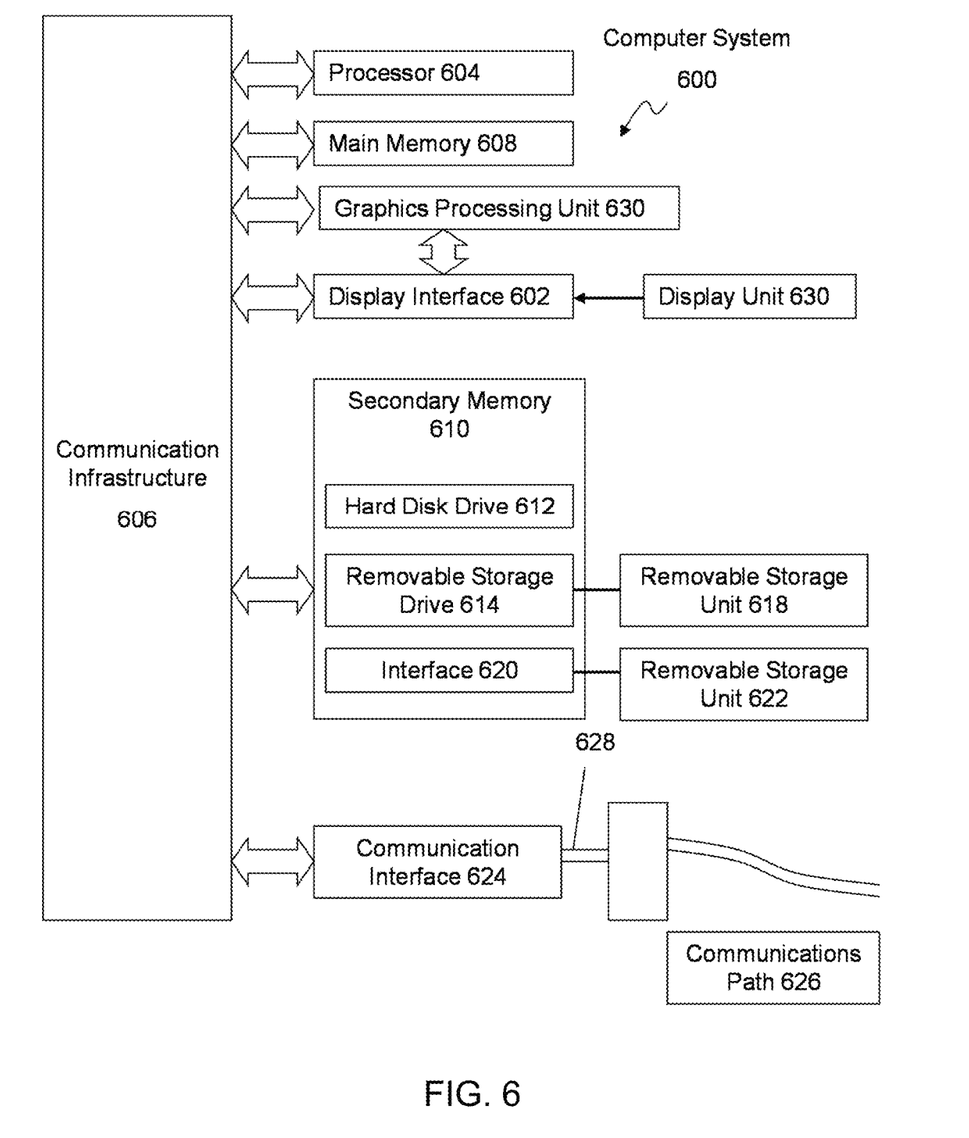
FIG. 6 presents an exemplary system diagram of various hardware components and other features, for use in accordance with aspects of the present disclosure.

Aspects of the present disclosure may be implemented using hardware, software, or a combination thereof and may be implemented in one or more computer systems or other processing systems. In one aspect, the disclosure is directed toward one or more computer systems capable of carrying out the functionality described herein. FIG. 6 presents an example system diagram of various hardware components and other features that may be used in accordance with aspects of the present disclosure. Aspects of the present disclosure may be implemented using hardware, software, or a combination thereof and may be implemented in one or more computer systems or other processing systems. In one exemplary variation, aspects of the disclosure are directed toward one or more computer systems capable of carrying out the functionality described herein. An example of such a computer system 600 is shown in FIG. 6.

Computer system 600 includes one or more processors, such as processor 604. The processor 604 is connected to a communication infrastructure 606 (e.g., a communications bus, cross-over bar, or network). Various software aspects are described in terms of this example computer system. After reading this description, it will become apparent to a person skilled in the relevant art(s) how to implement aspects of the disclosure using other computer systems and/or architectures.

Computer system 600 may include a display interface 602 that forwards graphics, text, and other data from the communication infrastructure 606 (or from a frame buffer not shown) for display on a display unit 630. Computer system 600 also includes a main memory 608, preferably random access memory (RAM), and may also include a secondary memory 610. The secondary memory 610 may include, for example, a hard disk drive 612 and/or a removable storage drive 614, representing a floppy disk drive, a magnetic tape drive, an optical disk drive, etc. The removable storage drive 614 reads from and/or writes to a removable storage unit 618 in a well-known manner. Removable storage unit 618, represents a floppy disk, magnetic tape, optical disk, etc., which is read by and written to removable storage drive 614. As will be appreciated, the removable storage unit 618 includes a computer usable storage medium having stored therein computer software and/or data.

In alternative aspects, secondary memory 610 may include other similar devices for allowing computer programs or other instructions to be loaded into computer system 600. Such devices may include, for example, a removable storage unit 622 and an interface 620. Examples of such may include a program cartridge and cartridge interface (such as that found in video game devices), a removable memory chip (such as an erasable programmable read only memory (EPROM), or programmable read only memory (PROM)) and associated socket, and other removable storage units 622 and interfaces 620, which allow software and data to be transferred from the removable storage unit 622 to computer system 600.

Computer system 600 may also include a communications interface 624. Communications interface 624 allows software and data to be transferred between computer system 600 and external devices. Examples of communications interface 624 may include a modem, a network interface (such as an Ethernet card), a communications port, a Personal Computer Memory Card International Association (PCMCIA) slot and card, etc. Software and data transferred via communications interface 624 are in the form of signals 628, which may be electronic, electromagnetic, optical or other signals capable of being received by communications interface 624. These signals 628 are provided to communications interface 624 via a communications path (e.g., channel) 626. This path 626 carries signals 628 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 680, a hard disk installed in hard disk drive 670, and signals 628. These computer program products provide software to the computer system 600. Aspects of the disclosure are directed to such computer program products.

Computer programs (also referred to as computer control logic) are stored in main memory 608 and/or secondary memory 610. Computer programs may also be received via communications interface 624. Such computer programs, when executed, enable the computer system 600 to perform various features in accordance with aspects of the present disclosure, as discussed herein. In particular, the computer programs, when executed, enable the processor 604 to perform such features. Accordingly, such computer programs represent controllers of the computer system 600.

In variations where aspects of the disclosure are implemented using software, the software may be stored in a computer program product and loaded into computer system 600 using removable storage drive 614, hard disk drive 612, or communications interface 620. The control logic (software), when executed by the processor 604, causes the processor 604 to perform the functions in accordance with aspects of the disclosure as described herein. In another variation, aspects are implemented primarily in hardware using, for example, hardware components, such as application specific integrated circuits (ASICs). Implementation of the hardware state machine so as to perform the functions described herein will be apparent to persons skilled in the relevant art(s).

In yet another example variation, aspects of the disclosure are implemented using a combination of both hardware and software.

Figure 7:
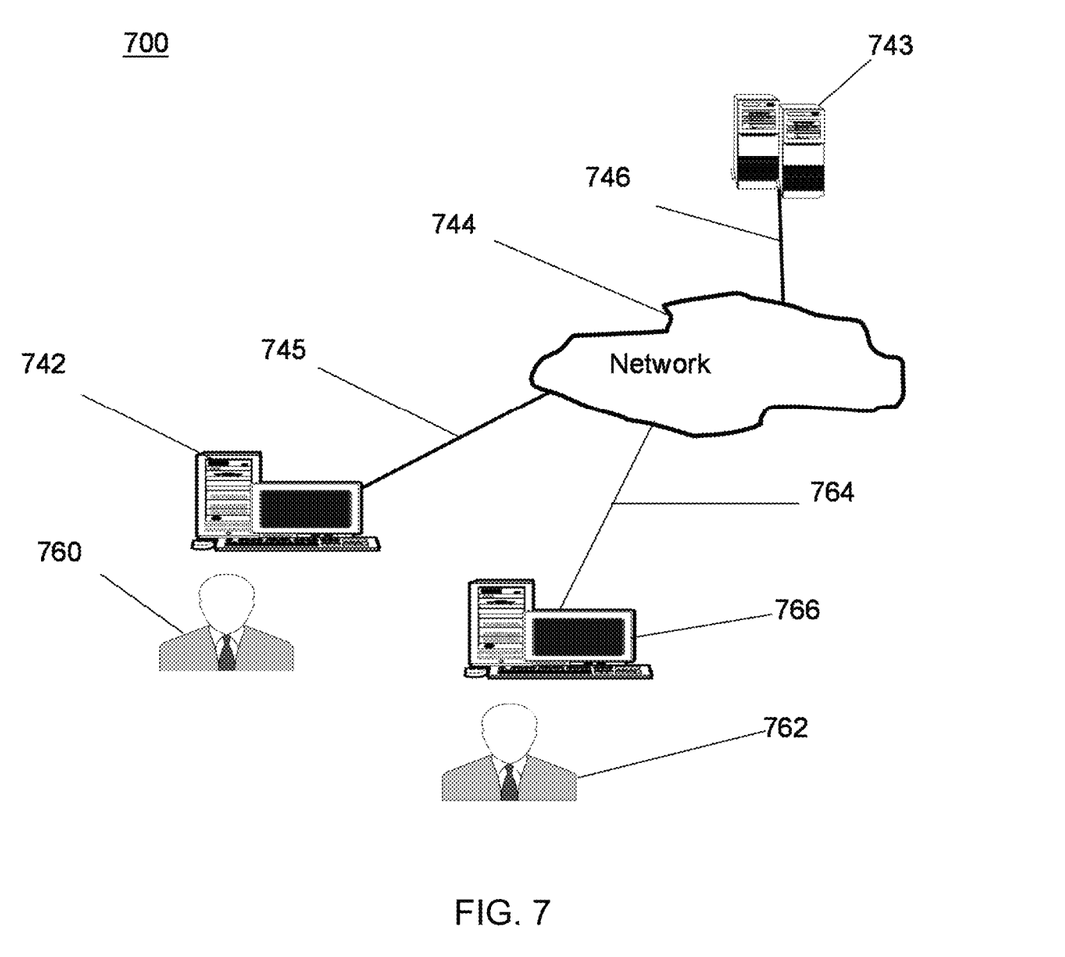
FIG. 7 is a block diagram of various exemplary system components, for use in accordance with aspects of the present disclosure.

FIG. 7 is a block diagram of various example system components that may be used in accordance with aspects of the present disclosure. For example, the various components may be within the vehicle 102, or only some of the components may be within the vehicle 102, and other components may be remote from the vehicle 102. The system 700 includes one or more accessors 760, 762 (also referred to interchangeably herein as one or more "users") and one or more terminals 742, 766 (such terminals may be or include, for example, various features of the autonomous driving system 110). In one aspect, data for use in accordance with aspects of the present disclosure is, for example, input and/or accessed by accessors 760, 762 via terminals 742, 766, such as personal computers (PCs), minicomputers, mainframe computers, microcomputers, telephonic devices, or wireless devices, such as personal digital assistants ("PDAs") or a hand-held wireless devices coupled to a server 743, such as a PC, minicomputer, mainframe computer, microcomputer, or other device having a processor and a repository for data and/or connection to a repository for data, via, for example, a network 744, such as the Internet or an intranet, and couplings 745, 746, 764. The couplings 745, 746, 764 include, for example, wired, wireless, or fiber optic links. In another example variation, the method and system in accordance with aspects of the present disclosure operate in a stand-alone environment, such as on a single terminal.

The aspects of the disclosure discussed herein may also be described and implemented in the context of computer-readable storage medium storing computer-executable instructions. Computer-readable storage media includes computer storage media and communication media. For example, flash memory drives, digital versatile discs (DVDs), compact discs (CDs), floppy disks, and tape cassettes. Computer-readable storage media may include volatile and nonvolatile, removable and non-removable media implemented in any method or technology for storage of information such as computer readable instructions, data structures, modules or other data.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

The invention claimed is:

1. A method of determining a position of a vehicle in a world coordinate system relative to a surrounding environment, comprising:
    obtaining a LiDAR map of the surrounding environment at a vehicle location via a LiDAR device mounted on the vehicle;
    accessing a transition map based on the vehicle location to determine a transformation between the LiDAR map and a stored high-definition map defined in a world coordinate system, wherein the transition map defines a six degrees of freedom transformation that indicates an adjustment to each of an x coordinate, a y coordinate, a z coordinate, a yaw value, a pitch value, and a roll value for each of a plurality of locations; and
    applying the transformation to an element of the LiDAR map to determine a corresponding location of the element on the high-definition map, wherein applying the transformation comprises adjusting each of the x coordinate, they coordinate, the z coordinate, the yaw value, the pitch value, and the roll value of the element by the adjustment indicated by the transition map.

2. The method of claim 1, wherein the LiDAR map and the high-definition map are three-dimensional maps.

3. The method of claim 2, wherein the vehicle location is a two dimensional location.

4. The method of claim 1, wherein accessing the transition map to determine the transformation comprises interpolating the six degrees of freedom transformation corresponding to the vehicle location from a subset of the six degrees of freedom transformations for each of the plurality of locations.

5. The method of claim 4, wherein each of the plurality of locations corresponds to an element identified in both the LiDAR map and the high-definition map, and the transformation is based on a change in coordinates of the element between the LiDAR map and the high-definition map.

6. The method of claim 1, wherein accessing the transition map to determine the transformation comprises retrieving a six degrees of freedom transformation that is pre-calculated for a current grid location corresponding to the vehicle location.

7. The method of claim 6, wherein the six degrees of freedom transformation for the current grid location is pre-calculated based on a change in coordinates of one or more identified elements between the LiDAR map and the high-definition map from a perspective of a vehicle at the current grid location.

8. The method of claim 1, further comprising performing an autonomous driving operation based on a location of the vehicle with respect to the element of the high-definition map.

9. A vehicle, comprising:
    a light detection and ranging (LiDAR) system mounted on the vehicle and configured to generate a LiDAR map of a surrounding environment at a vehicle location in a world coordinate system;
    a memory; and
    a processor communicatively coupled to the memory and the LiDAR system, the processor configured to:
    access a transition map in the memory based on the vehicle location to determine a transformation between the LiDAR map and a stored high-definition map defined in the world coordinate system, wherein the transition map defines a six degrees of freedom transformation that indicates an adjustment to each of an x coordinate, a y coordinate, a z coordinate, a yaw value, a pitch value, and a roll value for each of a plurality of locations; and
    apply the transformation to an element of the LiDAR map by adjusting each of the x coordinate, the y coordinate, the z coordinate, the yaw value, the pitch value, and the roll value of the element by the adjustment indicated by the transition map to determine a corresponding location of the element on the high-definition map.

10. The vehicle of claim 9, wherein the LiDAR map and the high-definition map are three-dimensional maps.

11. The vehicle of claim 9, wherein the processor is configured to interpolate the six degrees of freedom transformation corresponding to the vehicle location from a subset of the six degrees of freedom transformations for each of the plurality of locations.

12. The vehicle of claim 11, wherein each of the plurality of locations corresponds to an element identified in both the LiDAR map and the high-definition map, and the transformation is based on a change in coordinates of the identified element between the LiDAR map and the high-definition map.

13. The vehicle of claim 9, wherein the processor is configured to retrieve a six degrees of freedom transformation that is pre-calculated for a current grid location corresponding to the vehicle location using the transition map.

14. The vehicle of claim 13, wherein the six degrees of freedom transformation for the current grid location is pre-calculated based on a change in coordinates of one or more identified elements between the LiDAR map and the high-definition map from a perspective of a vehicle at the current grid location.

15. The vehicle of claim 9, wherein the processor is configured to control the vehicle to perform an autonomous driving operation based on a location of the vehicle with respect to the element of the high-definition map.

16. A vehicle localization system for determining a position of a vehicle relative to a surrounding environment, comprising:
   a light detection and ranging (LiDAR) system mounted on the vehicle and configured to generate a LiDAR map of the surrounding environment at a vehicle location in a world coordinate system;
   a high-definition map including a three-dimensional representation of the surrounding environment in the world coordinate system;
   a transition map that defines a six degrees of freedom transformation that indicates an adjustment to each of an x coordinate, a y coordinate, a z coordinate, a yaw value, a pitch value, and a roll value for each of a plurality of locations; and
   a transition module configured to access the transition map based on the vehicle location to determine a transformation between the LiDAR map and the high-definition map and to apply the transformation to an element of the LiDAR map by adjusting each of the x coordinate, they coordinate, the z coordinate, the yaw value, the pitch value, and the roll value of the element by the adjustment indicated by the transition map to determine a corresponding location of the element on the high-definition map.

17. The vehicle localization system of claim 16, wherein each of the plurality of locations is a location of a feature identifiable in both the high-definition map and the LiDAR map.

18. The vehicle localization system of claim 16, wherein the transition module is configured to interpolate a six degrees of freedom transformation corresponding to the vehicle location from a subset of the six degrees of freedom transformations for each of the plurality of locations.

19. The vehicle localization system of claim 18, wherein each of the plurality of locations corresponds to an element identified in both the LiDAR map and the high-definition map, and the transformation is based on a change in coordinates of the identified element between the LiDAR map and the high-definition map.

20. The vehicle localization system of claim 16, wherein the transition module is configured to retrieve a six degrees of freedom transformation that is pre-calculated for a current grid location corresponding to the vehicle location using the transition map.

* * * * *